(12) United States Patent
Katsuyama

(10) Patent No.: US 10,785,378 B2
(45) Date of Patent: Sep. 22, 2020

(54) DISPLAY-AND-OPERATION DEVICE AND IMAGE FORMING APPARATUS

(71) Applicant: Goro Katsuyama, Kanagawa (JP)

(72) Inventor: Goro Katsuyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/293,813

(22) Filed: Mar. 6, 2019

(65) Prior Publication Data
US 2019/0289150 A1   Sep. 19, 2019

(30) Foreign Application Priority Data

Mar. 16, 2018   (JP) ................. 2018-049449

(51) Int. Cl.
| | |
|---|---|
| *G06F 3/12* | (2006.01) |
| *H04N 1/00* | (2006.01) |
| *G06F 3/14* | (2006.01) |
| *G06K 15/02* | (2006.01) |
| *H04W 4/80* | (2018.01) |

(52) U.S. Cl.
CPC ....... *H04N 1/00541* (2013.01); *G06F 3/1279* (2013.01); *G06F 3/1292* (2013.01); *H04N 1/00278* (2013.01)

(58) Field of Classification Search
None
See application file for complete search history.

(56) References Cited

U.S. PATENT DOCUMENTS

| | | | |
|---|---|---|---|
| 2006/0040713 A1* | 2/2006 | Kim ................ | H04N 5/74 455/566 |
| 2006/0067064 A1* | 3/2006 | Crews .............. | H05K 1/182 361/761 |
| 2007/0002160 A1* | 1/2007 | Goto ................ | H04N 5/2253 348/340 |

(Continued)

FOREIGN PATENT DOCUMENTS

| | | |
|---|---|---|
| JP | 2001-230893 | 8/2001 |
| JP | 2013-147015 | 8/2013 |

(Continued)

*Primary Examiner* — Beniyam Menberu

(74) *Attorney, Agent, or Firm* — Harness, Dickey & Pierce, P.L.C.

(57) ABSTRACT

A display-and-operation device includes a housing, a display operation panel, a wireless communicator, a control board, and a holder. The display operation panel forms a display operation screen on an outer surface of the housing. The wireless communicator is included in the housing and includes an antenna to perform wireless communication with a communication object. The control board is included in the housing, to control the display operation panel. The holder is included in the housing. The holder holds the display operation panel. The housing includes an opening through which the wireless communicator is removable to an outside of the housing and a lid to open and close the opening. At least a part of the wireless communicator is arranged outside an outer peripheral edge of at least one of the control board and the holder when viewed from a side at which the display operation screen is disposed.

19 Claims, 8 Drawing Sheets

(56) References Cited

U.S. PATENT DOCUMENTS

| | | | | |
|---|---|---|---|---|
| 2007/0285320 | A1* | 12/2007 | Hayes | G06K 19/07732 343/702 |
| 2008/0080145 | A1* | 4/2008 | Chikazawa | G06F 1/203 361/719 |
| 2008/0100712 | A1* | 5/2008 | Hayes | H04N 5/2251 348/207.99 |
| 2008/0186688 | A1* | 8/2008 | Nachmani | G06F 1/184 361/752 |
| 2012/0287003 | A1* | 11/2012 | Kao | H01Q 1/243 343/702 |
| 2013/0023134 | A1* | 1/2013 | Lin | H01R 12/52 439/78 |
| 2013/0260829 | A1* | 10/2013 | Zhao | H04M 1/0277 455/558 |
| 2013/0316664 | A1* | 11/2013 | Kim | H04N 5/64 455/90.1 |
| 2014/0327926 | A1 | 11/2014 | Katsuyama | |
| 2015/0138025 | A1* | 5/2015 | Horikoshi | H01Q 7/06 343/702 |
| 2015/0287008 | A1* | 10/2015 | Simpkins | G06K 7/10336 700/232 |
| 2016/0142866 | A1* | 5/2016 | Jang | H02J 50/12 455/41.1 |
| 2017/0141470 | A1* | 5/2017 | Yong | H01Q 1/243 |
| 2018/0102600 | A1* | 4/2018 | Lai | H01R 12/7005 |

FOREIGN PATENT DOCUMENTS

| | | |
|---|---|---|
| JP | 2014-096717 | 5/2014 |
| JP | 2014-232305 | 12/2014 |
| JP | 2015-046830 | 3/2015 |
| JP | 2016-221765 | 12/2016 |
| JP | 2017-028477 | 2/2017 |
| JP | 2017-196747 | 11/2017 |

* cited by examiner

DISPLAY-AND-OPERATION DEVICE AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2018-049449, filed on Mar. 16, 2018, in the Japan Patent Office, the entire disclosure of which is incorporated by reference herein.

BACKGROUND

Technical Field

Aspects of the present disclosure relate to a display-and-operation device and an image forming apparatus.

Related Art

In recent years, in image forming apparatuses such as copying machines and printers, a technique to transmit information from a terminal device such as a cellular phone or a smartphone using near field wireless communication such as near field communication (NFC) to operate various devices is adopted.

As an image forming apparatus capable of performing such wireless communication, for example, a configuration is proposed in which a wireless communicator (substrate) including an antenna is built in a display-and-operation device (touch panel type display) provided to the main body of the apparatus.

SUMMARY

In an aspect of the present disclosure, there is provided a display-and-operation device that includes a housing, a display operation panel, a wireless communicator, a control board, and a holder. The display operation panel forms a display operation screen on an outer surface of the housing. The wireless communicator is included in the housing and includes an antenna to perform wireless communication with a communication object. The control board is included in the housing. The control board controls the display operation panel. The holder is included in the housing. The holder holds the display operation panel. The housing includes an opening through which the wireless communicator is removable to an outside of the housing and a lid to open and close the opening. At least a part of the wireless communicator is arranged outside an outer peripheral edge of at least one of the control board and the holder when viewed from a side at which the display operation screen is disposed.

In another aspect of the present disclosure, there is provided an image forming apparatus that includes the display-and-operation device.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
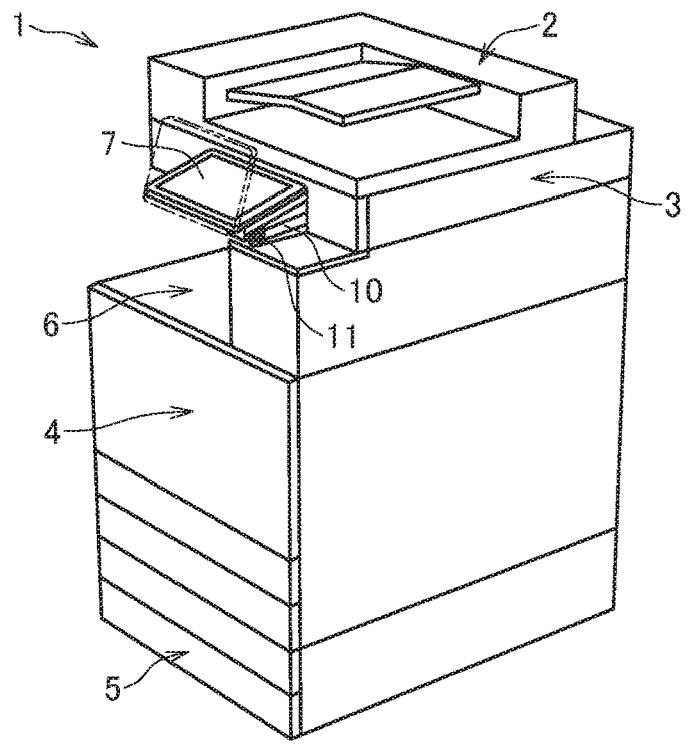
FIG. 1 is a perspective view of an image forming apparatus according to one embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, the present disclosure will be described with reference to the accompanying drawings. In the respective drawings for describing the present disclosure, components such as members or parts having the same function or shape are denoted by the same symbol where distinguishable, and thereby description of the components is omitted after once described.

FIG. 1 is a perspective view of an image forming apparatus according to one embodiment of the present disclosure.

An image forming apparatus 1 illustrated in FIG. 1 is a copying machine including a document conveyor 2, an image reader 3 to read image information of a document conveyed by the document conveyor 2, an image former 4 to form an image on a paper as a recording medium on the basis of image information read by the image reader 3 or image information transmitted from an external terminal, a paper feeder 5 to supply paper to the image former 4, a paper ejector 6 to eject the paper on which the image is formed to the outside, and a display-and-operation device 7 to perform a printing instruction, to input various settings, and so on. Note that the image forming apparatus according to the present disclosure is not limited to copying machines, but may be a printer, a plotter, a facsimile machine, or multifunction peripherals of such devices.

As illustrated in FIG. 1, the display-and-operation device 7 is provided on the upper front side (a side facing an operator) of the main body of the image forming apparatus. In the present embodiment, a base 10 projecting forward from the front side of the main body of the image forming apparatus is included, and the display-and-operation device 7 is provided on the base 10 via an angle changing means 11 including a hinge mechanism. The display-and-operation device 7 rotates about the rotation axis of the angle changing means 11 included at the front end of the base 10, which allows the angle of the display-and-operation device 7 to be adjusted between a flat attitude as indicated by a solid line in FIG. 1 and an upright attitude indicated by a two-dot chain line in FIG. 1.

Figure 2:
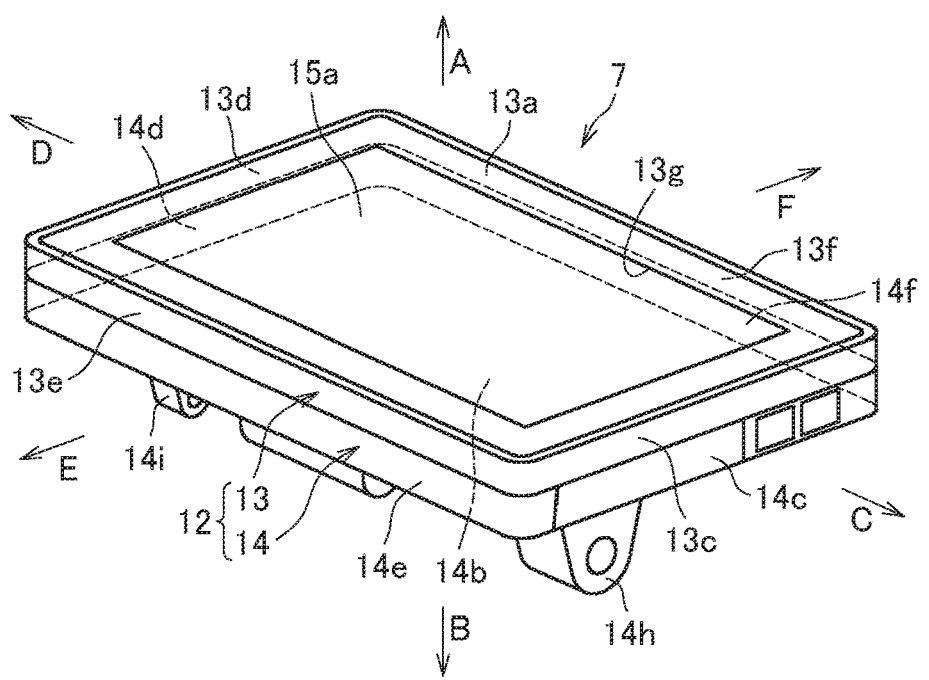
FIG. 2 is a perspective view of a display-and-operation device.

FIG. 2 is a perspective view of the display-and-operation device 7.

Hereinafter, in the explanation of the display-and-operation device 7, respective directions of the display-and-operation device 7 are defined for the display-and-operation device 7 in the flat attitude that is in a substantially horizontal state illustrated in FIG. 2. That is, descriptions are given with the direction of arrow A in FIG. 2 as being "up," the direction of arrow B as being "down," the direction of arrow C as being "right," the direction of arrow D as being "left," the direction of arrow E as being "front," and the direction of arrow F as being "back."

As illustrated in FIG. 2, the display-and-operation device 7 includes a housing 12 made of resin and including a front cover 13 as a first housing and a back cover 14 as a second housing. The front cover 13 is a rectangular frame body including a front portion 13a in which a rectangular hole 13g, where a display operation screen 15a is arranged, is formed and four side portions 13c, 13d, 13e, and 13f arranged around the front portion 13a so as to intersect with (be orthogonal to) the front portion 13a. The back cover 14 is a member having a thin case shape including a rectangular back portion 14b forming an outer surface on the opposite side to the front portion 13a of the front cover 13 and four side portions 14c, 14d, 14e, and 14f arranged around the back portion 14b so as to intersect with (be orthogonal to) the back portion 14b. The front cover 13 and the back cover 14 are assembled in the vertical direction by engagement between engagement portions included on side portions of the both covers. Two protrusions 14h and 14i forming the hinge mechanism of the angle changing means 11 are provided on the left and the right ends on the back portion 14b of the back cover 14. The display-and-operation device 7 is rotatably coupled to the base 10 via the protrusions 14h and 14i.

Figure 3:
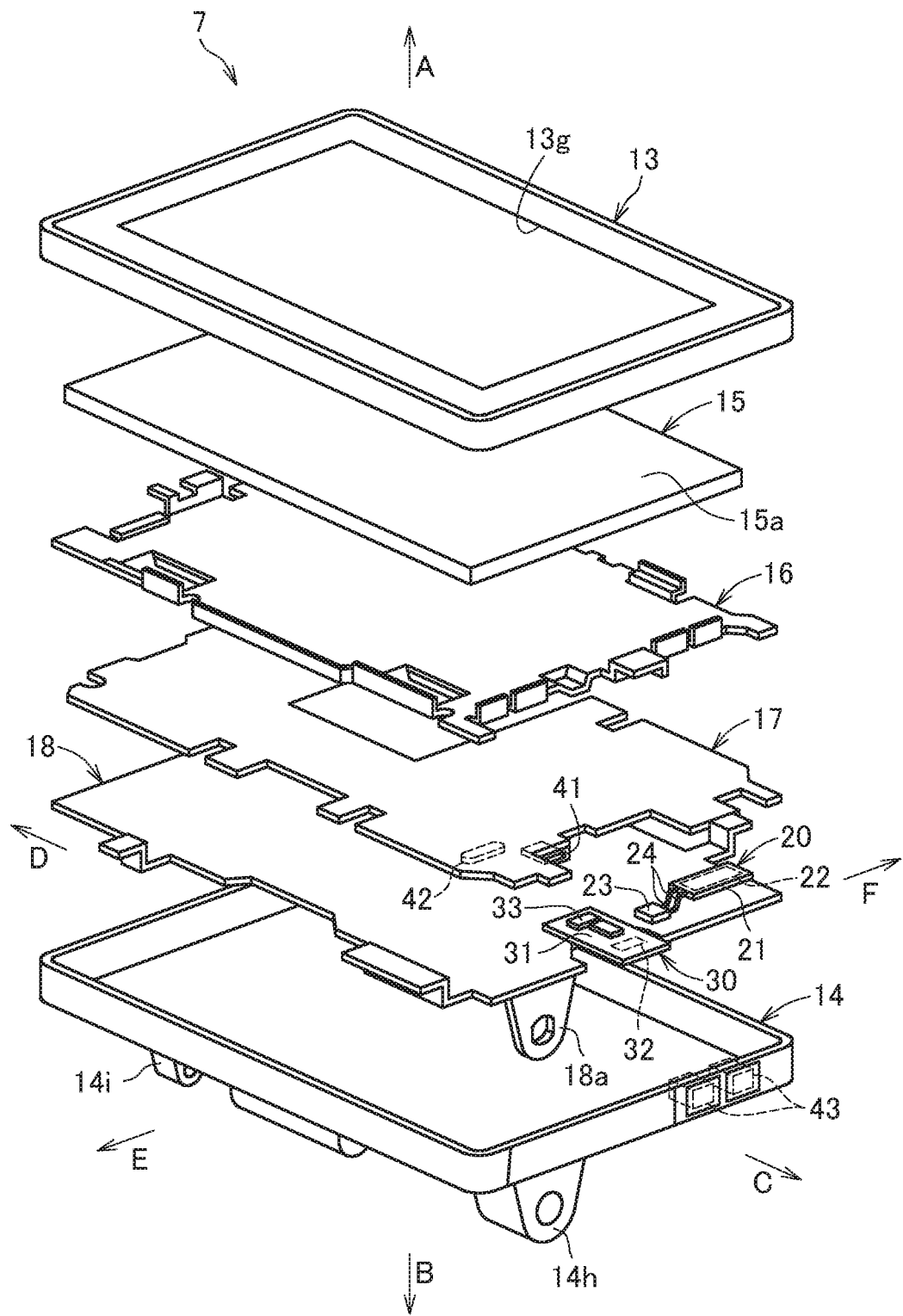
FIG. 3 is an exploded perspective view of the display-and-operation device.

FIG. 3 is an exploded perspective view of the display-and-operation device 7.

The directions indicated by arrows A to F in FIG. 3 are the same as the directions in FIG. 2.

As illustrated in FIG. 3, the display-and-operation device 7 includes the front cover 13, the back cover 14, a display operation panel 15, a holding frame 16, a control board 17, a coupling frame 18, a first wireless communicator 20, and a second wireless communicator 30. The display operation panel 15, the holding frame 16, the control board 17, the coupling frame 18, the first wireless communicator 20, and the second wireless communicator 30 are housed between the front cover 13 and the back cover 14.

The display operation panel 15 includes a pressure-sensitive or electrostatic touch sensor of a sheet shape superimposed on a liquid crystal display module. That is, the display operation panel 15 is of a so-called touch panel type that allows an operator to operate operation keys (characters, pictures, etc.) displayed on the liquid crystal display module by touching the touch sensor. The display operation panel 15 is sandwiched and held between the holding frame 16 and the front cover 13 with the holding frame 16 made of metal secured to the front cover 13 with screws from below. With the display operation panel 15 held in this manner and the top surface of the display operation panel 15 exposed from the hole 13g of the front cover 13, a rectangular display operation screen 15a is formed on the top surface (outer surface) of the front cover 13.

The control board 17 is electrically connected to the liquid crystal display module and the touch sensor of the display operation panel 15 and performs display control of the liquid crystal display module and reception of input signals from the touch sensor to control the display operation panel 15. The control board 17 is sandwiched and held between the coupling frame 18 and the holding frame 16 with the coupling frame 18 made of metal secured to the holding frame 16 with screws from below.

A projecting piece 18a projecting downward is provided on the right end of the coupling frame 18. This projecting piece 18a is a part forming the hinge mechanism of the angle changing means 11. In a state in which the respective components of the display-and-operation device 7 are assembled, the projecting piece 18a is housed in the protrusion 14h provided on the right end of the back cover 14 and is coupled to a rotating shaft of the angle changing means 11. Note that, in the present embodiment, the load of rotational torque at the time of angle adjustment is applied only to the right side, and thus the projecting piece 18a for receiving this load is provided only on the right end of the coupling frame 18.

The first wireless communicator 20 and the second wireless communicator 30 perform wireless communication with a communication object such as a smartphone or a tablet terminal held by an operator. The first wireless communicator 20 and the second wireless communicator 30 have wireless communication boards 21 and 31, loop-shaped antennas 22 and 32, and connectors 23 and 33, respectively. Note that the connector 23 of the first wireless communicator 20 is provided to the wireless communication board 21 via a cable 24. On the other hand, the connector 33 of the second wireless communicator 30 is provided to the wireless communication board 31 without a cable. With the connectors 23 and 33 connected to the connectors 41 and 42, respectively, included on the control board 17, the first wireless communicator 20 and the second wireless communicator 30 are electrically connected to the control board 17.

Here, although both the first wireless communicator 20 and the second wireless communicator 30 are provided for the purpose of short-range wireless communication for performing transmission and reception of information to and from a communication object that is placed (close to or to be in contact with) to the front cover 13 of the housing 12, since the wireless communicators are selectively used depending on the intended use of the operator, different communication systems are adopted for the first wireless communicator 20 and the second wireless communicator 30. Specifically, in the present embodiment, the communication system of the near field communication (NFC) is adopted for the first wireless communicator 20 and Bluetooth (registered trademark) communication system is adopted for the second wireless communicator 30.

The communicable range of the first wireless communicator 20 (NFC) with respect to a communication object is set to a relatively short distance (for example, less than or equal to 10 cm). On the other hand, the communicable range of the second wireless communicator 30 (Bluetooth) is set to be longer than the communicable range of the first wireless communicator 20. The communicable range referred to here is a communication range measured in an environment in which communication can be performed between a communication object and an antenna without interference. Generally, Bluetooth enables wireless communication within a range of about several meters to several tens of meters; however, in the present embodiment, in order to avoid radio wave interference and crosstalk with a wireless communicator installed in another image forming apparatus installed in the surroundings, the antenna 32 of the second wireless communicator 30 is downsized to set the communicable range shorter than usual.

Figure 4:
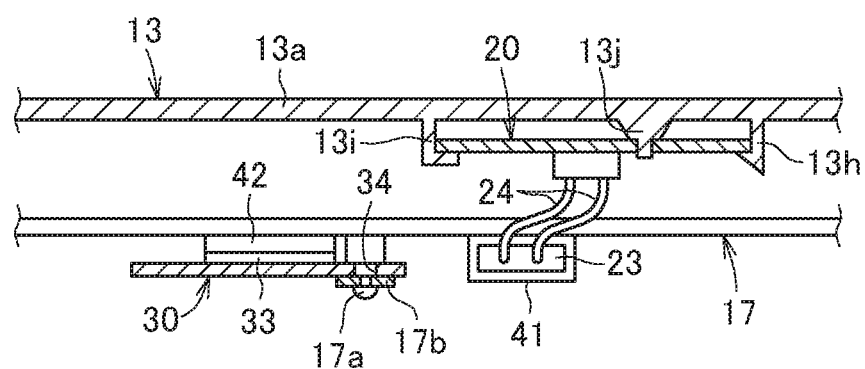
FIG. 4 is a view illustrating an arrangement relationship in the vertical direction between a first wireless communicator and a second wireless communicator.

FIG. 4 is a view illustrating an arrangement relationship in the vertical direction between the first wireless communicator 20 and the second wireless communicator 30.

As described above, the first wireless communicator 20 is set to have a shorter communicable range with respect to a communication object as compared to the second wireless communicator 30, and thus as illustrated in FIG. 4 the first wireless communicator 20 is arranged at a position closer to (upper) the front portion 13a of the front cover 13, to which the communication object is placed close, than the second wireless communicator 30 is. On the other hand, since the communicable range of the second wireless communicator 30 is set to be longer than the communicable range of the first wireless communicator 20, the second wireless communicator 30 is arranged at a position separated away downward from the front portion 13a of the front cover 13 as compared to the first wireless communicator 20 is.

As described above, in the present embodiment, since the first wireless communicator 20 is arranged at a position close to the front portion 13a of the front cover 13, the first wireless communicator 20 is attached to an inner surface (lower surface) of the front portion 13a. Specifically, as illustrated in FIG. 4, the first wireless communicator 20 is secured by claw-like engagement portions 13h and 13i and a positioning protrusion 13j provided on the inner surface of the front portion 13a, thereby allowing the first wireless communicator 20 to be attached to the front cover 13.

Meanwhile, the second wireless communicator 30 is attached under the control board 17. Specifically, as illustrated in FIG. 4, a pin-like projection 17a provided on the control board 17 is inserted through a hole 34 formed in the second wireless communicator 30. On the distal end side of the inserted projection 17a, a stopper 17b is attached, thereby preventing the second wireless communicator 30 from coming off the projection 17a. Moreover, the connector 33 of the second wireless communicator 30 is connected to the connector 42 of the control board 17, and this connection between the connectors 33 and 42 also functions as a means to attach (secure) the second wireless communicator 30 to the control board 17.

Note that in a case where the second wireless communicator 30 can be prevented from coming off the control board 17 by the fixing force of the connection between the connectors 33 and 42, the projection 17a and the stopper 17b may be eliminated. However, in the present embodiment, since the connector 33 is arranged closer to the left end of the second wireless communicator 30 (see FIG. 3), if only with the connection between the connectors 33 and 42, there is a possibility that the second wireless communicator 30 is cantilevered and thus is not stable. Therefore, in the present embodiment, in order to securely fix the second wireless communicator 30 to the control board 17, fixation by the projection 17a and the stopper 17b is employed on the end side opposite to the connector 33 side.

Meanwhile, since the connector 23 of the first wireless communicator 20 is provided on the wireless communication board 21 via the cable 24, the connection between the connectors 23 and 41 does not function as a means to secure the first wireless communicator 20. As described above, as a result that the first wireless communicator 20 is arranged at a position close to the front portion 13a of the front cover 13, the first wireless communicator 20 is arranged at a position separated away upward from the control board 17 on the contrary. Thus, the connector 23 with the cable 24 is used so as to be connected to the connector 41 of the control board 17 at a distant position.

Incidentally, in the image forming apparatus including the wireless communicators, as described above, there are cases where it is necessary to detach the wireless communicators from the display-and-operation device for the purpose of user's requests, maintenance, etc. Therefore, in the present embodiment, the following measures are taken to facilitate detachment and detaching work of the wireless communicators.

Figure 5:
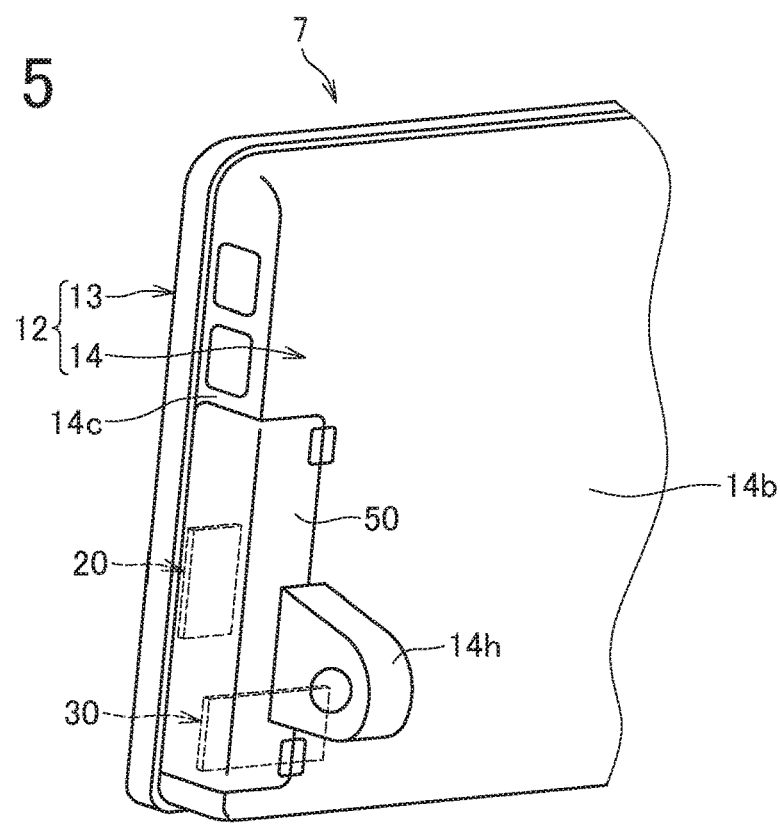
FIG. 5 is a perspective view of the display-and-operation device as viewed from the back side.

FIG. 5 is a perspective view of the display-and-operation device 7 as viewed from the back side.

As illustrated in FIG. 5, on the back side of the housing 12 of the display-and-operation device 7, there is provided a detachable lid 50 to allow the first wireless communicator 20 and the second wireless communicator 30 housed inside to be removed to the outside. The lid 50 of the present embodiment is provided in a portion corresponding to a place where the wireless communicators 20 and 30 are housed, across the back portion 14b and the right side portion 14c of the back cover 14.

Figure 6:
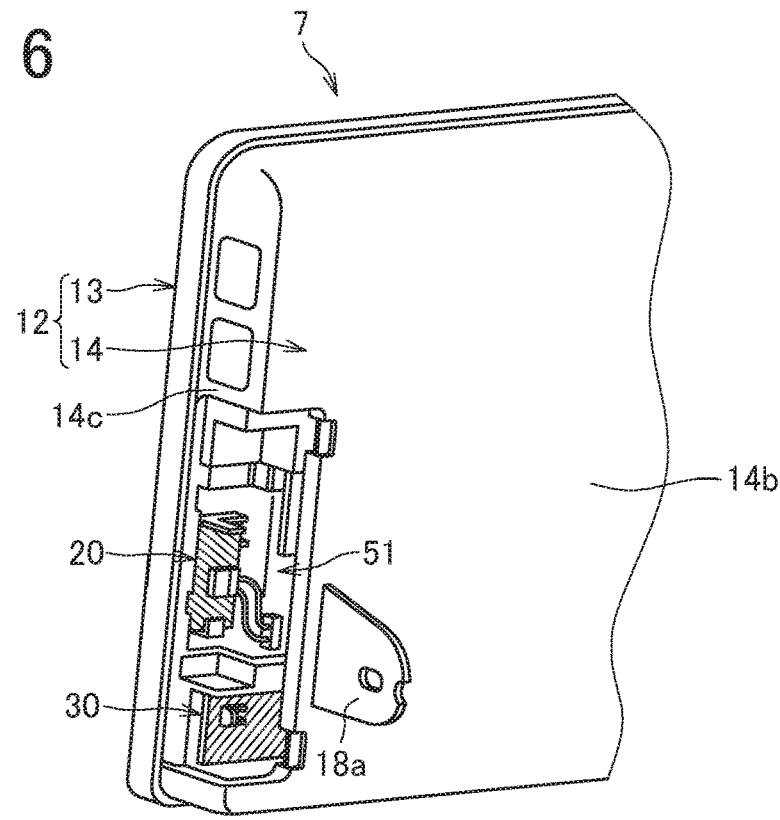
FIG. 6 is a perspective view illustrating a state in which a lid is detached.

FIG. 6 is a perspective view illustrating a state in which the lid 50 is detached.

As illustrated in FIG. 6, when the lid 50 is removed, an opening 51 is formed on the back side and the right side of the display-and-operation device 7, and the first wireless communicator 20 and the second wireless communicator 30 are exposed to the outside. Since the lid 50 is formed integrally with the protrusion 14h (see FIG. 5) provided on the back cover 14 in the present embodiment, when the lid 50 is removed, the protrusion 14h is also removed together with the lid 50. In this manner, removal of the lid 50 allows the wireless communicators 20 and 30 to be removed through the opening 51. Note that the lid 50 may be doubled or tripled.

Next, before explaining the method for detaching the wireless communicators 20 and 30, the attachment structure (securing means) of the wireless communicators 20 and 30 briefly mentioned in the above description will be described in detail with reference to FIGS. 7 to 12.

Figure 7:
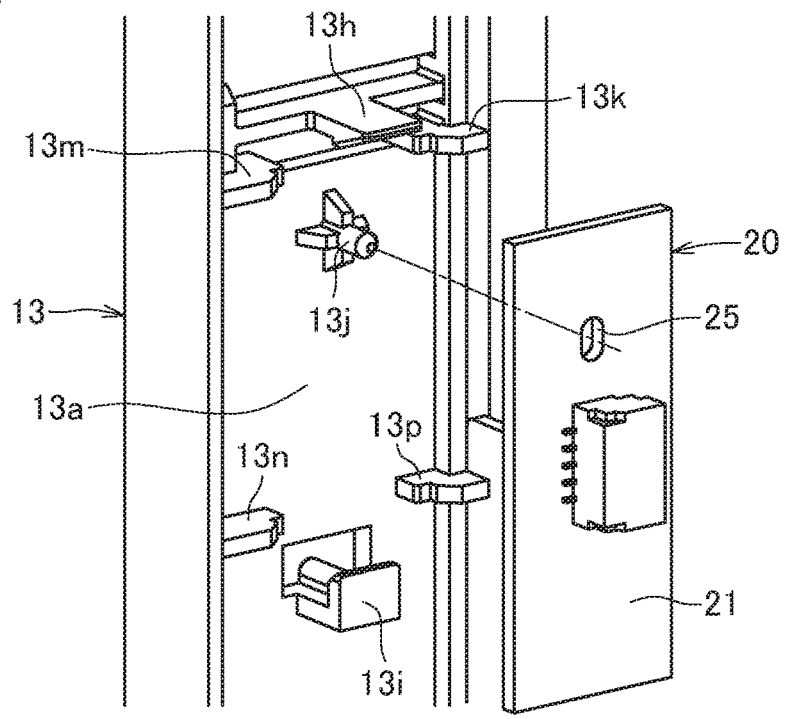
FIG. 7 is a perspective view illustrating an attachment structure for attachment of the first wireless communicator.

FIG. 7 is a perspective view illustrating the attachment structure for attachment of the first wireless communicator 20.

Note that in FIG. 7, the attachment structure is focused, and some of the surrounding members are omitted. The same applies to FIGS. 9 to 11 as well.

As illustrated in FIG. 7, on the inner surface of the front portion 13a of the front cover 13, there are provided two claw-like engagement portions 13h and 13i to prevent vertical movement of the first wireless communicator 20 and separation in a direction away from the front portion 13a, a positioning protrusion 13j to regulate movement of the first wireless communicator 20 in a direction to approach the front portion 13a, and four receiving portions 13k, 13m, 13n, and 13p to regulate horizontal movement and movement in a direction to approach the front portion 13a of the first wireless communicator 20. On the other hand, the wireless communication board 21 of the first wireless communicator 20 is formed with a hole 25 through which the positioning protrusion 13j is inserted.

Figure 8:
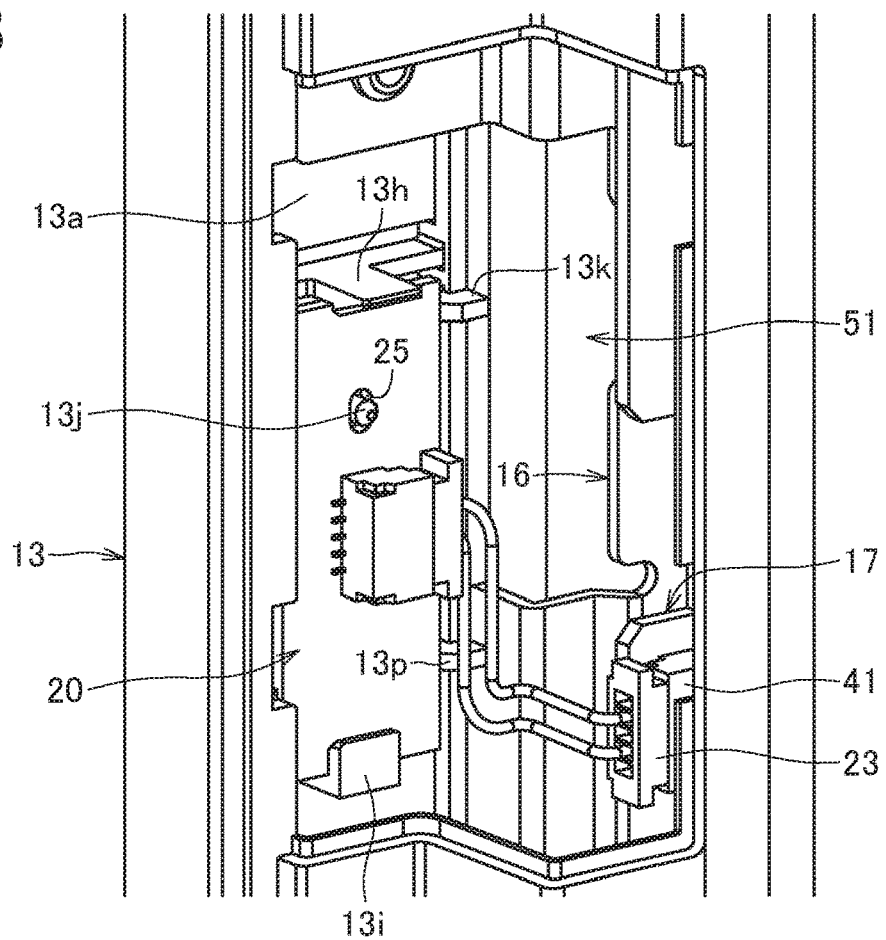
FIG. 8 is a perspective view illustrating a state in which the first wireless communicator is attached.

To attach the first wireless communicator 20, first, the position and orientation of the first wireless communicator 20 are determined such that the hole 25 of the first wireless communicator 20 corresponds to the positioning protrusion 13j. Then, the first wireless communicator 20 is pushed in among the two engagement portions 13h and 13i and the four receiving portions 13k, 13m, 13n, and 13p such that the tip of the positioning protrusion 13j is inserted into the hole 25. As a result, movement of the first wireless communicator 20 in the respective directions is restricted by the engagement portions 13h and 13i, the positioning protrusion 13j, and the receiving portions 13k, 13m, 13n, and 13p, which completes attachment of the first wireless communicator 20. FIG. 8 is a view illustrating a state in which attachment of the first wireless communicator 20 is completed. Note that in FIG. 8, the connector 23 of the first wireless communicator 20 is also connected.

Figure 9:
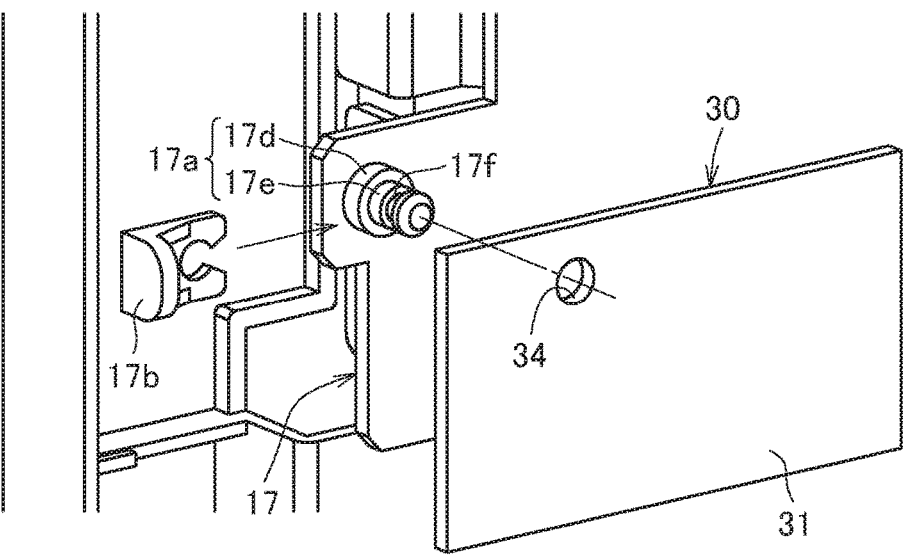
FIG. 9 is a perspective view illustrating an attachment structure for attachment of the second wireless communicator.

FIG. 9 is a perspective view illustrating the attachment structure for attachment of the second wireless communicator 30.

As illustrated in FIG. 9, the control board 17 is provided with a pin-like projection 17a for attachment of the second wireless communicator 30. The projection 17a includes a large-diameter receiving portion 17d provided to the control board 17 and a distal shaft portion 17e on the tip side formed to have a smaller diameter (thinner) than the diameter of the receiving portion 17d. Furthermore, a groove 17f for attachment of the stopper 17b, which is bifurcated, is formed on the distal shaft portion 17e. Meanwhile, the wireless communication board 31 of the second wireless communicator 30 is formed with the hole 34 through which the distal shaft portion 17e of the projection 17a is inserted. The diameter of the hole 34 is larger than or equal to the diameter of the distal shaft portion 17e of the projection 17a and is smaller than the diameter of the receiving portion 17d of the projection 17a.

Figure 10:
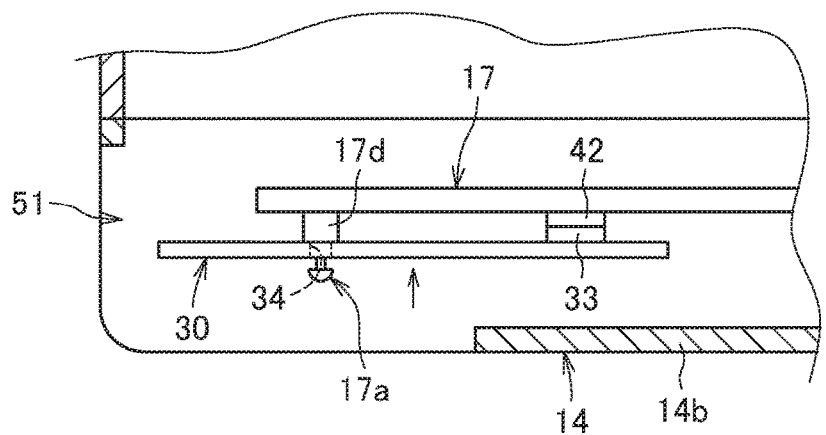
FIG. 10 is a side view illustrating a state in which the second wireless communicator is being attached.

To attach the second wireless communicator 30, the distal shaft portion 17e of the projection 17a is first inserted through the hole 34 of the second wireless communicator 30. At this time, as illustrated in FIG. 10, it is preferable to connect the connector 33 of the second wireless communicator 30 to the connector 42 of the control board 17 together with the insertion of the projection 17a into the hole 34. With the projection 17a inserted into the hole 34, the second wireless communicator 30 abuts against the receiving portion 17d of the projection 17a, which regulates movement of the second wireless communicator 30 in a direction to approach the control board 17 of the second wireless communicator 30.

Figure 11:
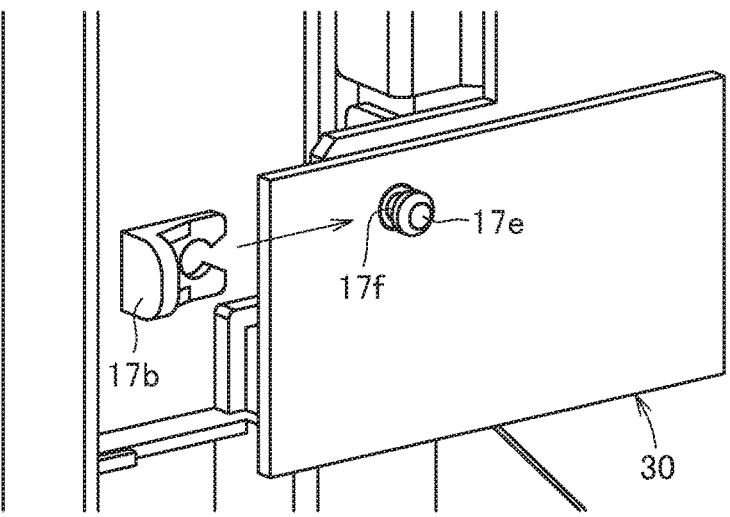
FIG. 11 is a perspective view illustrating a state in which the second wireless communicator is being attached.
Figure 12:
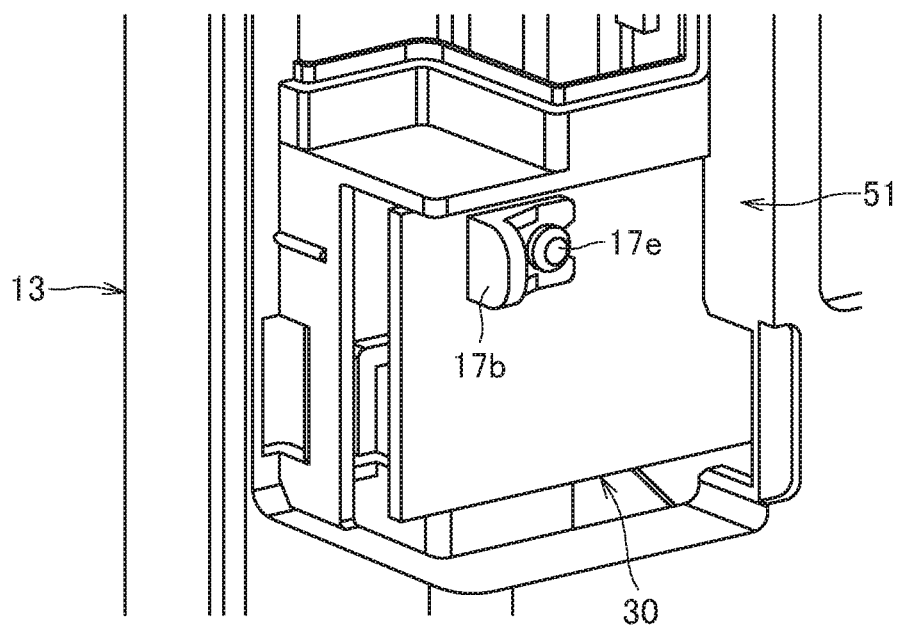
FIG. 12 is a perspective view illustrating a state in which the second wireless communicator is attached.

Then, as illustrated in FIG. 11, the stopper 17b is fitted to the groove 17f formed in the distal shaft portion 17e to attach the second wireless communicator 30. As a result, the state illustrated in FIG. 12 is obtained, and the second wireless communicator 30 is prevented from coming off the projection 17a. Note that, other than the structure of being fitted into the groove 17f, the stopper 17b may have, for example, a female threaded structure to be tightened and secured to a male threaded portion formed at the tip of the projection 17a.

In order to detach the wireless communicators 20 and 30 attached as described above, it is only necessary to remove the lid 50 and then to perform detachment operation in the order reverse to the attachment procedure described above.

That is, to detach the first wireless communicator 20, at least one of the two engagement portions 13h and 13i is bent outward from the state illustrated in FIG. 8 to release the engagement of the engagement portions 13h and 13i with the first wireless communicator 20. Then, the first wireless communicator 20 is detached away from the front cover 13. In addition, as illustrated in FIG. 8, in the case where the connector 23 of the first wireless communicator 20 is connected to the connector 41 of the control board 17, the connectors 23 and 41 are also disconnected. The connectors 23 and 41 may be disconnected before or after the first wireless communicator 20 is detached from the front cover 13. This allows the first wireless communicator 20 to be removed to the outside through the opening 51.

Figure 13:
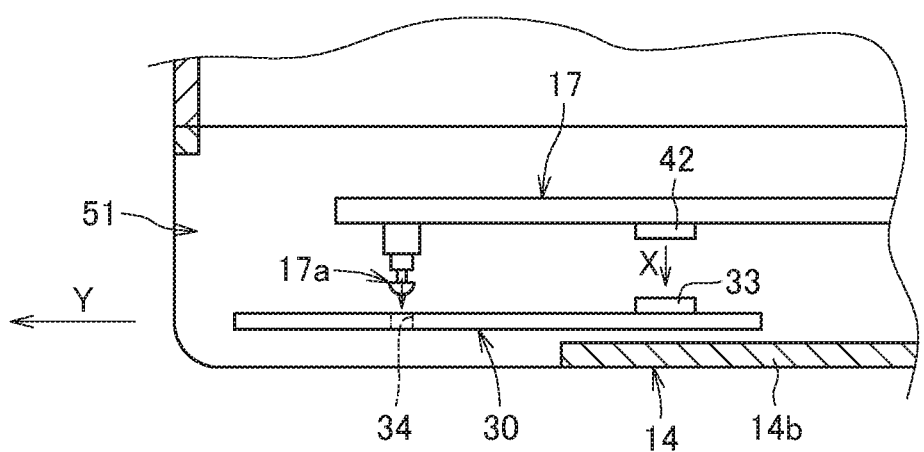
FIG. 13 is a view for explaining a method for detaching the second wireless communicator.

In a case where the second wireless communicator 30 is detached, the stopper 17b is removed from the state illustrated in FIG. 12, and then the second wireless communicator 30 is withdrawn from the projection 17a of the control board 17 from the state illustrated in FIG. 11. In conjunction with the withdrawing action above, as illustrated in FIG. 13, it is preferable to also disconnect the connectors 33 and 42 of the second wireless communicator 30 and the control board 17, respectively. Since the separation direction (withdrawing direction) of the second wireless communicator 30 from the projection 17a and the disconnecting direction of the connectors 33 and 42 are the same in the present embodiment, it is easy to disconnect the connectors 33 and 42 in conjunction with the withdrawing action of the second wireless communicator 30. Thus, it is unlikely that an excessive force is applied to the connectors 33 and 42. With such a configuration, when the second wireless communicator 30 is attached as described above, similarly, no excessive force is applied to the connectors 33 or 42, thus facilitating connecting work of the connectors 33 and 42.

Detaching the second wireless communicator 30 from the control board 17 allows the second wireless communicator 30 to be removed from the opening 51. In this embodiment, as illustrated in FIG. 13, since the connector 42 of the control board 17 is arranged in the back of the opening 51 (right side in FIG. 13), if moved only in the withdrawing direction from the projection 17a (direction indicate by arrow X in FIG. 13), the second wireless communicator 30 interferes with the back portion 14b of the back cover 14. Therefore, in this embodiment, after the second wireless communicator 30 is withdrawn from the projection 17a, by moving the second wireless communicator 30 in a direction (direction indicated by arrow Y in FIG. 13) intersecting with the withdrawing direction, the second wireless communicator 30 can be removed from the opening 51.

As described above, in the present embodiment, since the opening 51 that can be opened and closed is included in the housing 12 of the display-and-operation device 7, the first wireless communicator 20 and the second wireless communicator 30 can be detached and removed to the outside without troublesome work such as unpacking and disassembling the housing 12. As described above, the wireless communicators 20 and 30 can be removed through the opening 51 in this embodiment. In order to further facilitate the removing work, the wireless communicators 20 and 30 and the holding frame 16, the control board 17, and the coupling frame 18 arranged around the wireless communicators 20 and 30 are arranged in the following manner.

Figure 14:
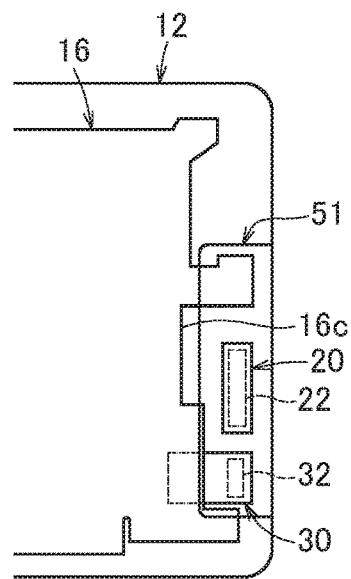
FIG. 14 is a view illustrating an arrangement of the respective wireless communicators with respect to a holding frame.
Figure 15:
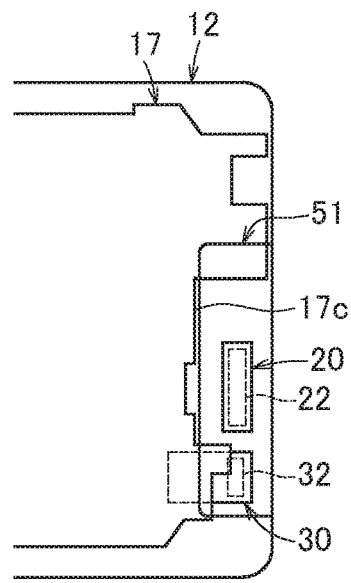
FIG. 15 is a view illustrating an arrangement of the respective wireless communicators with respect to a control board.
Figure 16:
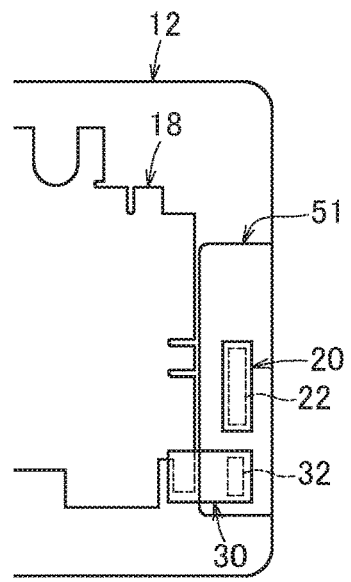
FIG. 16 is a view illustrating an arrangement of the respective wireless communicators with respect to a coupling frame.

FIG. 14 is a view illustrating the arrangement of the wireless communicators 20 and 30 with respect to the holding frame 16. FIG. 15 is a view illustrating the arrangement of the wireless communicators 20 and 30 with respect to the control board 17. FIG. 16 is a view illustrating the arrangement of the wireless communicators 20 and 30 with respect to the coupling frame 18. FIGS. 14 to 16 are all views as viewed from the display operation screen 15a side.

First, as illustrated in FIGS. 14 to 16, when viewed from the display operation screen 15a, side, the whole first wireless communicator 20 is arranged outside the outer peripheral edge of any one of the holding frame 16, the control board 17, and the coupling frame 18. In this manner, since the whole first wireless communicator 20 is arranged outside the respective outer peripheral edges of the holding frame 16, the control board 17, and the coupling frame 18 so as not to overlap with any of the holding frame 16, the control board 17, and the coupling frame 18 at all. Thus, the holding frame 16, the control board 17, and the coupling frame 18 are unlikely to obstruct the detaching work or the removing work of the first wireless communicator 20, and thus it is easy to detach or to remove the first wireless communicator 20.

In particular, in the present embodiment, since the first wireless communicator 20 is arranged at a position in the far back from the opening 51 (on the back side of the front portion 13a) (see FIG. 8), if the holding frame 16, the control board 17, and the coupling frame 18 are arranged so as to overlap, on the front side, with the first wireless communicator 20, it is quite difficult to detach or to remove the first wireless communicator 20. In contrast, in the present embodiment, the first wireless communicator 20 is arranged so as not to overlap with any of the holding frame 16, the control board 17, and the coupling frame 18 at all. Therefore, the first wireless communicator 20 can be easily detached or removed.

On the other hand, as illustrated in FIGS. 14 to 16, the second wireless communicator 30 partially overlaps with the holding frame 16, the control board 17, and the coupling frame 18 as viewed from the display operation screen 15a side. However, in the present embodiment, a portion of the second wireless communicator 30 on the opening 51 side is arranged outside the respective outer peripheral edges of the holding frame 16, the control board 17, and the coupling frame 18 so as not to overlap with any of the holding frame 16, the control board 17, and the coupling frame 18 to facilitate the detaching work or the removing work of the second wireless communicator 30.

In the case of the present embodiment, since the second wireless communicator 30 is arranged closer to the opening 51 than the first wireless communicator 20 is, in this point the second wireless communicator 30 is easier to be detached or removed as compared to the first wireless communicator 20. However, in the case where the second wireless communicator 30 entirely overlaps with the holding frame 16, the control board 17, and the coupling frame 18, it is difficult for a worker to pinch the second wireless communicator 30 with fingers or a tool to detach or to remove the second wireless communicator 30. Therefore, since at least the portion of the second wireless communicator 30 on the opening 51 side is arranged so as not to overlap with the holding frame 16, the control board 17, and the coupling frame 18 in the present embodiment, the second wireless communicator 30 can be easily detached or removed. Moreover, in the present embodiment, since the stopper 17b attached to the back side of the second wireless communicator 30 is neither covered by the coupling frame 18 arranged in the back of the stopper 17b but is arranged at a position exposed from the opening 51 (see FIG. 12), the stopper 17b can be easily detached.

In addition, as illustrated in FIGS. 14 and 15, in the present embodiment, recesses 16c and 17c are formed on the outer peripheral edges of the holding frame 16 and the control board 17, respectively. At least one of the first wireless communicator 20 and the second wireless communicator 30 is arranged at positions corresponding to these recesses 16c and 17c (in the recesses 16c and 17c). By disposing at least one of the wireless communicators 20 and 30 at positions corresponding to the recesses 16c and 17c as described above, the wireless communicator can be arranged closer to the holding frame 16 and other components to enable downsizing of the display-and-operation device 7 as compared with the case where the recesses 16c and 17c are not formed while the ease of removal of the wireless communicator can be ensured.

Furthermore as illustrated in FIG. 14 and other drawings, the first wireless communicator 20 and the second wireless communicator 30 are arranged so as to be displaced from each other in the front-back direction (vertical direction in FIG. 14) in the present embodiment as viewed from the display operation screen 15a side. Since the two wireless communicators 20 and 30 are arranged so as to be displaced from each other in the front-back direction, the wireless communicators 20 and 30 are unlikely to interfere with each other when detached or removed, thereby facilitating the detaching work and the removing work.

Furthermore, in the present embodiment, since the opening 51 is formed across the back portion 14b and the right side portion 14c of the back cover 14 (see FIG. 6), a worker can access the wireless communicators 20 and 30 from two directions from the back side and the right side. This further facilitates the detaching work or the removing work of the wireless communicators 20 and 30.

In addition, since the two wireless communicators 20 and 30 are both arranged on the same side of the display-and-operation device 7 in the present embodiment (right side in the present embodiment), the wireless communicators 20 and 30 can be detached or removed through the single opening 51. That is, since it is not necessary to detach or remove the plurality of wireless communicators 20 and 30 through separate openings, the workability is improved. This can also reduce chances that other electronic parts in the display-and-operation device 7 are unnecessarily exposed, thereby preventing the risks of failures caused by a worker unintentionally touching other electronic parts.

In the present embodiment, since the wireless communicators 20 and 30 are arranged on the same side with external-device connectors 43 (see FIG. 3), such as a universal serial bus (USB) terminal and a high-definition multimedia interface (HDMI) (registered trademark) terminal, for connection with external devices such as a card authentication device, these external-device connectors 43 can also be accessed through the opening 51.

Regarding the embodiment of the present disclosure, the ease of detaching work and removing work of the wireless communicators has been described above; however, the same similarly applies to attaching work and replacement work of the wireless communicators. Therefore, by adopting an embodiment of the present disclosure, replacement work (detaching and attaching work) of a wireless communicator such as maintenance, or attaching work in the case of adding a wireless communicator to a device without a wireless communicator are also facilitated.

Note that embodiments of the present disclosure are not limited to the above-described embodiments, and it goes without saying that various modifications can be made without departing from the gist of the present disclosure.

In the embodiment described above, the lid 50 is detachable from the housing 12 of the display-and-operation device 7; however, the lid 50 may be attached to the housing 12 in an openable and closable manner via a hinge mechanism or the like.

In the embodiment described above, considering that in general there are many right-handed operators, the wireless communicators 20 and 30 are arranged on the right side of the display-and-operation device 7; however, the wireless communicators 20 and 30 may be arranged on the left side of the display-and-operation device 7 or may be arranged on the front side or the back side.

Moreover, the wireless communicators may employ communication systems other than the NFC or Bluetooth an may perform wireless communication with a communication object such as a non-contact type IC card in addition to a smartphone and a tablet terminal. Further, the present invention is also applicable to a display-and-operation device including only one wireless communicator and a display-and-operation device having no angle adjustment function.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A display-and-operation device, comprising:
a housing having a front cover and a back cover;
a display operation panel forming a display operation screen on an outer surface of the housing;
at least one wireless communicator included in the housing and including an antenna and a communication board to perform wireless communication with a communication object;
a control board, included in the housing, to control the display operation panel; and
a holder included in the housing, to hold the display operation panel,
the control board and the holder overlapping with each other in a vertical direction with respect to a surface of the display operation panel,
the at least one wireless communicator including a first wireless communicator including the antenna and the communication board each mounted on a surface of the front cover and disposed relatively closer to the display operation panel in the vertical direction than the control board,
at least a part of the first wireless communicator being arranged outside an outer peripheral edge of at least one of the control board and the holder when viewed from a side at which the display operation screen is disposed, wherein
the back cover includes a back portion, disposed opposite the display operation panel with respect to the control board, the back portion including an opening through which the first wireless communicator is removable from the housing.

2. The display-and-operation device of claim 1, wherein a recess is formed on the outer peripheral edge of at least one of the control board and the holder, and
at least a part of the at least one wireless communicator is arranged at a position corresponding to the recess when viewed from the side at which the display operation screen is disposed.

3. The display-and-operation device of claim 1, wherein the opening is formed across the back portion and a side portion of the housing,
wherein the back portion forms another outer surface opposite to the outer surface on which the display operation screen is formed, and
wherein the side portion intersects with the back portion.

4. The display-and-operation device of claim 3, wherein the first wireless communicator is detachably attached to an inner surface of the housing, the inner surface being a back side of the outer surface on which the display operation screen is formed.

5. The display-and-operation device of claim 3, wherein the at least one wireless communicator further includes a second wireless communicator, the second wireless communicator being detachably attached on a side, relatively closer to the back portion than to the control board and the holder.

6. The display-and-operation device of claim 5, wherein the first wireless communicator is displaced from the second wireless communicator in two directions.

7. An image forming apparatus comprising the display-and-operation device of claim 1.

8. The display-and-operation device of claim 1, wherein the at least one wireless communicator further includes a second wireless communicator, included in the housing and including an antenna to perform wireless communication, the second wireless communicator including a relatively longer communication range than the first wireless communicator.

9. The display-and-operation device of claim 8, wherein the first wireless communicator is located in the housing relatively closer to the display operation panel than the second wireless communicator.

10. The display-and-operation device of claim 9, wherein removal of a lid permits removal of both the first wireless communicator and the second wireless communicator through the opening.

11. The display-and-operation device of claim 8, wherein removal of a lid permits removal of both the first wireless communicator and the second wireless communicator through the opening.

12. The display-and-operation device of claim 8, wherein the first wireless communicator is displaced from the second wireless communicator in two directions.

13. The display-and-operation device of claim 1, wherein the display operation panel is fixed to the front cover, and the front cover includes a hole to expose the display operation panel.

14. A display-and-operation device, comprising:
a housing;
a display operation panel to form a display operation screen on an outer surface of the housing;
a wireless communicator included in the housing and including an antenna to perform wireless communication with a communication object;
a control board, included in the housing, to control the display operation panel; and
a holder included in the housing, to hold the display operation panel,
the housing including an opening through which the wireless communicator is removable to an outside of the housing and including a lid to open and close the opening,
at least a part of the wireless communicator being arranged outside an outer peripheral edge of at least one of the control board and the holder when viewed from a side at which the display operation screen is disposed,
wherein the wireless communicator includes a connector connected to the control board,
wherein the control board includes:
a projection insertable into a hole of the wireless communicator; and
a stopper attachable to a distal end side of the projection inserted into the hole to prevent the wireless communicator from coming off the projection, and
wherein a separation direction of the wireless communicator from the projection and a disconnection direction of the connector from the control board are a same direction.

15. An image forming apparatus comprising the display-and-operation device of claim 14.

16. The display-and-operation device of claim 14, wherein the wireless communicator includes a first and a second wireless communicator, included in the housing and including an antenna to perform wireless communication, the second wireless communicator including a relatively longer communication range than the first wireless communicator.

17. The display-and-operation device of claim 16, wherein the first wireless communicator is located in the housing relatively closer to the display operation panel than the second wireless communicator.

18. The display-and-operation device of claim 17, wherein removal of the lid permits removal of both the first wireless communicator and the second wireless communicator through the opening.

19. The display-and-operation device of claim 16, wherein removal of the lid permits removal of both the first wireless communicator and the second wireless communicator through the opening.

\* \* \* \* \*